United States Patent [19]

Brooks

[11] Patent Number: 5,390,490
[45] Date of Patent: Feb. 21, 1995

[54] METHOD AND APPARATUS FOR MEASURING THE EFFICACY OF A CATALYTIC CONVERTER

[75] Inventor: Timothy J. Brooks, Troy, Mich.

[73] Assignee: Ford Motor Company, Dearborn, Mich.

[21] Appl. No.: 145,549

[22] Filed: Nov. 4, 1993

[51] Int. Cl.$^6$ .............................................. F01N 3/20
[52] U.S. Cl. ..................................... 60/276; 60/277; 60/285
[58] Field of Search ................. 60/273, 274, 276, 277, 60/285; 123/672, 674, 703

[56] References Cited

U.S. PATENT DOCUMENTS

| | | | |
|---|---|---|---|
| 3,782,347 | 1/1974 | Schmidt et al. | 60/276 |
| 3,957,444 | 5/1976 | Goto | 60/277 |
| 4,015,428 | 4/1977 | Kawai | 60/277 |
| 4,024,850 | 5/1977 | Peter | 60/277 |
| 4,077,364 | 3/1978 | Aoki | 60/276 |
| 5,138,833 | 8/1992 | Kabasin | 60/285 |

*Primary Examiner*—Ira S. Lazarus
*Assistant Examiner*—Daniel J. O'Connor
*Attorney, Agent, or Firm*—Peter Abolins; Roger L. May

[57] ABSTRACT

An electronic engine controller (EEC) is utilized to perform an onboard diagnostic test of a catalytic converter. An upstream oxygen sensor detects the exhaust gas entering the catalytic converter and an downstream oxygen sensor detects the exhaust gas exiting the catalytic converter. An air/fuel mixture is maintained at a first bias level until the exhaust gas produced by combustion of the air/fuel mixture is detected by the downstream oxygen sensor at which point the air/fuel mixture is altered to a second bias level and maintained at the second bias level until the exhaust gas produced by combustion of the air/fuel mixture is detected by the downstream oxygen sensor. An amount of time required for the upstream oxygen sensor to detect the exhaust products of the first bias value and for the second bias value is calculated, and similar values are calculated for the downstream oxygen sensor. The EEC calculates a converter storage capacity value as a function of the first bias level and the first and second time durations and the second bias level and accompanying time durations, and is then compared against a predetermined minimum converter capacity value. If the converter storage capacity is less than or equal to the predetermined minimum converter capacity value then a converter inoperative condition is set.

11 Claims, 4 Drawing Sheets

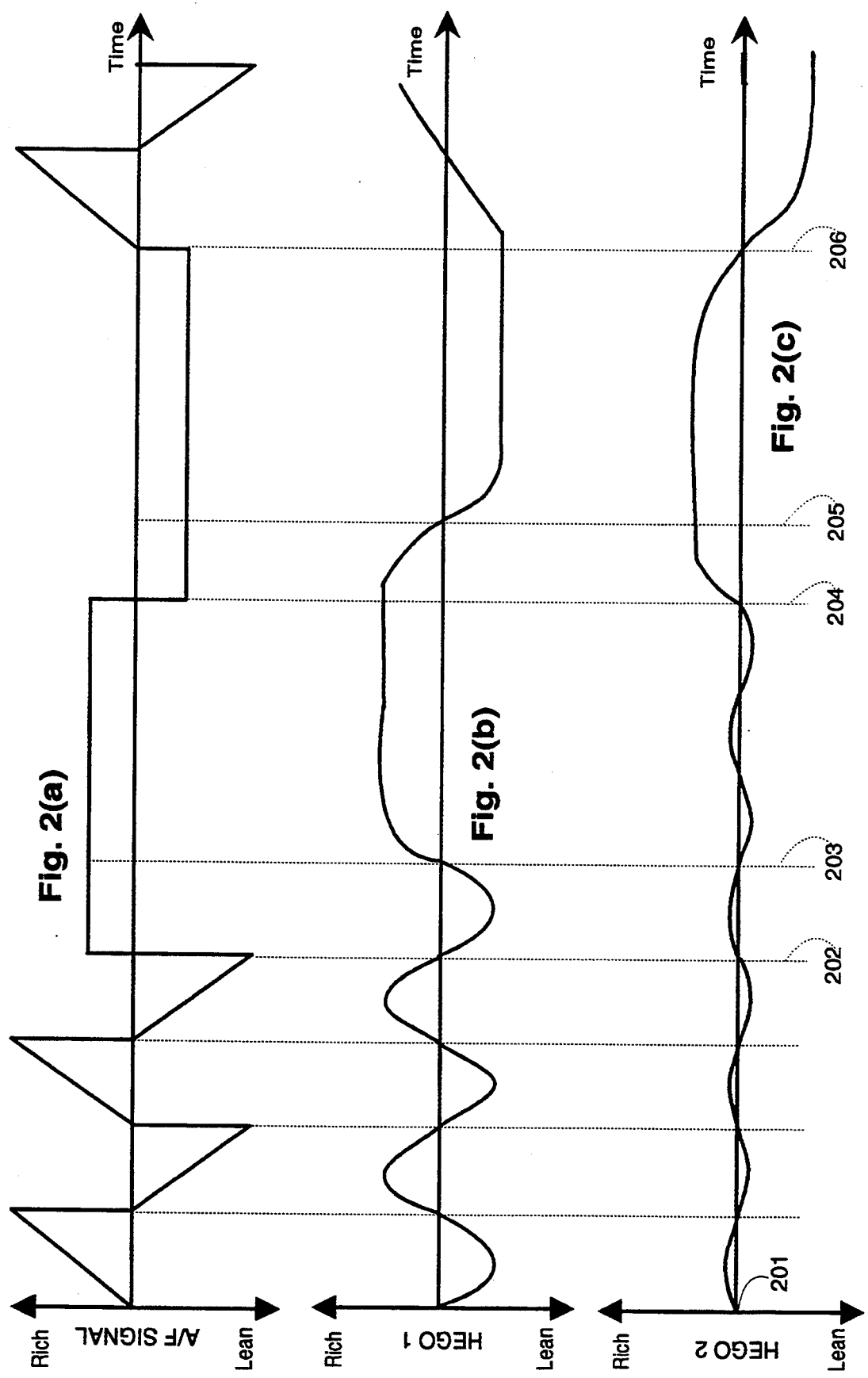

METHOD AND APPARATUS FOR MEASURING THE EFFICACY OF A CATALYTIC CONVERTER

FIELD OF THE INVENTION

This invention relates to methods and apparatus for determining the efficacy of catalytic converters, and more particularly, although in its broader aspects not exclusively, to the on-board determination of catalytic converter efficacy.

BACKGROUND OF THE INVENTION

Modern motor vehicle engines typically utilize a catalytic converter to reduce the exhaust gas emissions produced by the engine. Such converters operate to chemically alter the exhaust gas composition produced by the engine to help meet various environmental regulations governing tailpipe emissions. When operating properly, modem catalytic converters can significantly reduce the concentration of several undesirable components of exhaust gases.

Governmental regulations are imposing increasingly stringent standards for the efficacy of catalytic converters. Known methods for determining the efficacy of catalytic converters often have one or more of a variety of shortcomings, including being unable to quantify the efficacy of the converter, and causing unwanted side effects such as engine surge during efficacy testing, producing exhaust gases containing components of sufficient concentration to contribute to catalyst degradation, and emitting exhaust gases which exceed normal allowable levels.

Accordingly, there is a need for a catalytic converter testing method and system which provides an accurate, quantifiable measure of catalytic converter efficacy without producing the aforesaid unwanted side-effects.

SUMMARY OF THE INVENTION

It is an object of the present invention to provide an accurate, quantifiable indication of the efficacy of a catalytic converter, utilizing on-board diagnostics, without causing unwanted side-effects.

In accordance with the primary object of the invention, during an on-board test procedure, a first sensing means detects the oxygen content of the exhaust gas entering the catalytic converter and a second sensing means detects the oxygen content of the exhaust gas exiting the catalytic converter. The air/fuel mixture fed to the engine is maintained at a first bias value and a first time value indicative of the time required for the first sensing means to detect the exhaust gas produced from the combustion of the air/fuel mixture maintained at the first bias value is calculated. A second time value indicative of the time required for the second sensing means to detect the exhaust gas produced from the combustion of the air/fuel mixture maintained at the first bias value is also calculated and the efficacy of the catalytic converter is determined as a function of the first bias value and the first and second time values.

An advantage of at least certain preferred embodiments is that a quantifiable determination is made as to the efficacy of the converter in a manner which minimizes unwanted side-effects such as surging, catalyst degradation or increased exhaust gases.

These and other features and advantages of the present invention may be better understood by considering the following detailed description of preferred embodiments of the invention. In the course of this description, reference will be made to the attached drawings.

BRIEF DESCRIPTION OF THE DRAWINGS

FIGS. 2(a), 2(b) and 2(c) are graphs showing the relationship between various signal waveforms in a preferred embodiment of the invention.

DETAILED DESCRIPTION

Figure 1:
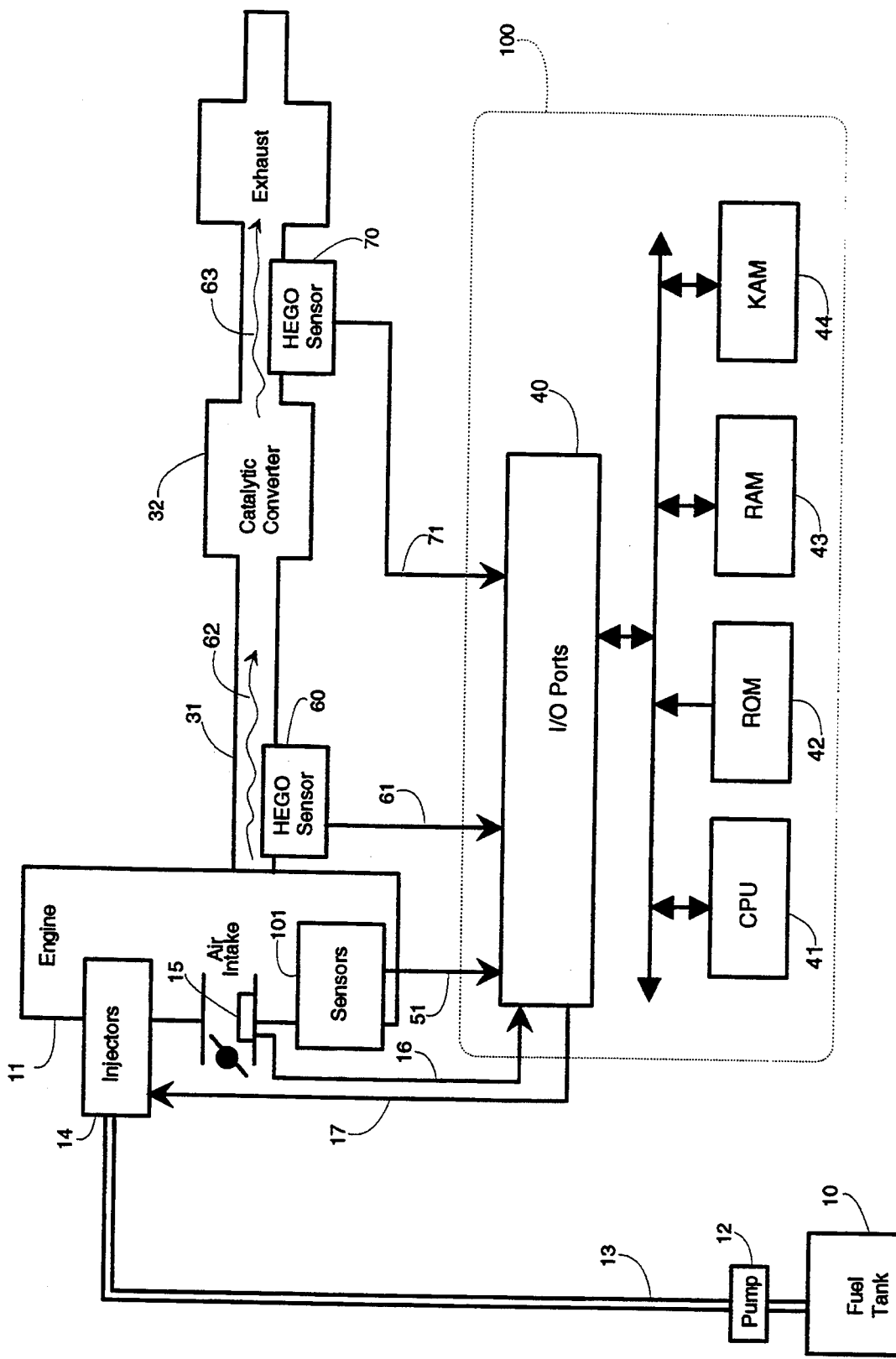
FIG. 1 is a schematic diagram of a system comprising an internal combustion engine and an electronic engine controller, which embodies the principles of the invention.

In FIG. 1 of the drawings a fuel pump 12 pumps fuel from a fuel tank 10 through a fuel line 13 to a set of fuel injectors 14 which inject fuel into an internal combustion engine 11. The fuel injectors 14 are of conventional design and are positioned to inject fuel into their associated cylinder in precise quantities as determined by an electronic engine controller (EEC) 100, transmitting a fuel injector signal to the injectors 14 via signal line 17. The fuel injector signal is varied over time by EEC 100 to maintain an air/fuel ratio determined by the EEC 100.The fuel tank 10 advantageously contains liquid fuels, such as gasoline, methanol or a combination of fuel types. A catalytic converter 32 contains a catalyst material which chemically alters exhaust gas 62 produced by the engine to generate a catalyzed exhaust gas 63.

An upstream heated exhaust gas oxygen (HEGO) sensor 60, positioned upstream of the catalytic converter 32 on the exhaust system 31 of the engine 11, detects the oxygen content of the exhaust gas 62 generated by the engine 11, and transmits a representative signal 61 to the EEC 100. A downstream HEGO sensor 70, positioned downstream of the catalytic converter 32, detects the oxygen content of the catalyzed exhaust gas 63 and transmits a representative signal 71 to the EEC 100. Still other sensors, indicated generally at 101, provide additional information about engine performance to the EEC 100, such as crankshaft position, angular velocity, throttle position, etc. The information from these sensors is used by the EEC 100 to control engine operation.

A mass air flow sensor 15 positioned at the air intake of engine 11 detects the amount of air being supplied to cylinders for combustion and supplies an air flow signal 16 to the EEC 100. The EEC 100 comprises a microcomputer including a central processor unit (CPU) 41, input and output (I/O) port 40, read only memory (ROM) 42 for storing control programs, random access memory (RAM) 43, for temporary data storage which may also be used for counters or timers, keep-alive memory (KAM) 44 for storing learned values, and a conventional data bus.

FIGS. 2(a), 2(b) and 2(c) of the drawings show the variation over time of waveforms representing respectively: an air/fuel (A/F) signal generated within the EEC 100 and used in generating the fuel injector signal transmitted via signal line 17 to control the delivery of fuel from the injectors 14, the output of upstream HEGO sensor 60, as transmitted by signal line 61, and the output of downstream HEGO sensor 70 as transmitted by signal line 71.

FIG. 2(a) is a graph showing the variations in the A/F signal (and hence the A/F ratio) about stoichiometry. The A/F signal is generated by a proportional-integral (P-I) controller in the EEC 100. The P-I controller responds to the upstream HEGO signal 61 to control the amount of fuel delivered by the injectors 14 by generating the A/F signal, which represents a desired change in relative air/fuel. As seen in FIG. 2(a), the A/F signal is varied about stoichiometry under such closed-loop operation from the time period represented between times 201 and 202. From time 202 to time 204, the A/F signal is maintained at a first bias value and at time 204, in response to the detection by the downstream HEGO sensor of the catalyzed exhaust gas resulting from the air/fuel mixture maintained at the first bias value, is abruptly altered to a second bias value, at which it is maintained until the downstream HEGO sensor detects the catalyzed exhaust gas resulting from the air/fuel mixture maintained at the second bias value at time 206.

FIG. 2(b) shows the response of the upstream HEGO sensor(HEGO 1) to the oxygen content in the exhaust gas generated from combustion of the air/fuel mixture as represented by the A/F signal in FIG. 2(a). As seen in FIG. 2(b) a time delay exists between the generation of a particular air/fuel mixture by the A/F signal and the detection by the upstream HEGO sensor of the corresponding combustion products. For instance, at 202, the A/F signal is increased abruptly from a lean value to the first bias value. The resulting exhaust gas however is not detected by the upstream HEGO sensor until a certain time duration later as shown at 203. Designated in the preferred embodiment as TDREVS, this value represents the physical time delay required for the engine to respond to the A/F signal by generating an air/fuel mixture, igniting the mixture, and propelling the resulting exhaust gas through the exhaust manifold and pipe so as to be detected by the upstream HEGO sensor.

FIG. 2(c) shows the response of the downstream HEGO sensor 70 (HEGO 2) to the catalyzed exhaust gases emitted from the catalytic converter. As seen in FIG. 2(c) the oxygen sinking and sourcing capability of the catalytic converter causes a delay from the detection of the exhaust gas generated by combustion of a particular air/fuel mixture by the upstream HEGO sensor, as seen in FIG. 2(b), to the detection of the catalyzed exhaust gases by the downstream HEGO sensor seen in FIG. 2(c). The first bias value initiated at time 202 by the A/F signal which is detected by the upstream HEGO sensor at time 203 is detected by the downstream HEGO sensor at time 204.

A preferred embodiment of the invention advantageously maintains the first bias value initiated at time 202, until exhaust gas generated from the combustion of an A/F mixture generated by the bias value is detected by the downstream HEGO sensor. Upon detection by the downstream HEGO sensor of the exhaust gas generated as a result of the first bias value, the preferred embodiment abruptly alters the A/F signal to a second bias value, which is of a similar magnitude to the first bias value but in an opposite direction from stoichiometry. As shown in FIG. 2(a), the first bias value generates an air/fuel mixture rich of stoichiometry. Consequently, the second bias value which is maintained from 204 to 206 generates an air/fuel mixture lean of stoichiometry. This feature offers the advantage of testing both the oxygen sinking and oxygen sourcing capabilities of the catalytic converter. This feature offers the additional advantage of restoring the capacity of the converter to chemically alter exhaust gas by subjecting the converter to an exhaust gas with an oxygen content sufficient to return the chemical alteration capacity to the capacity which existed prior to the converter test routine.

Figure 3A:
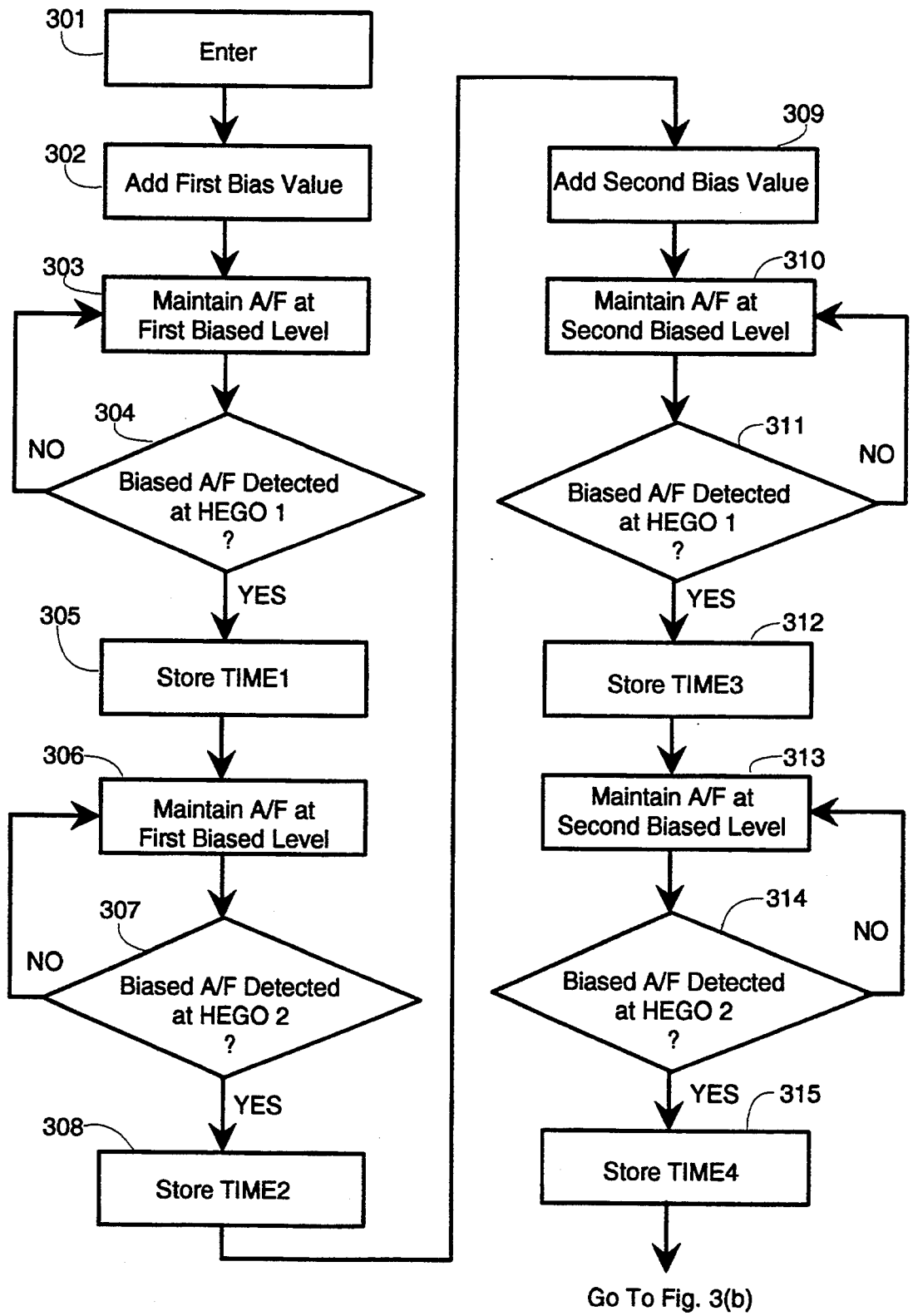
FIGS. 3(a) and 3(b) are flowcharts showing the operation of a preferred embodiment of the invention.
Figure 3B:
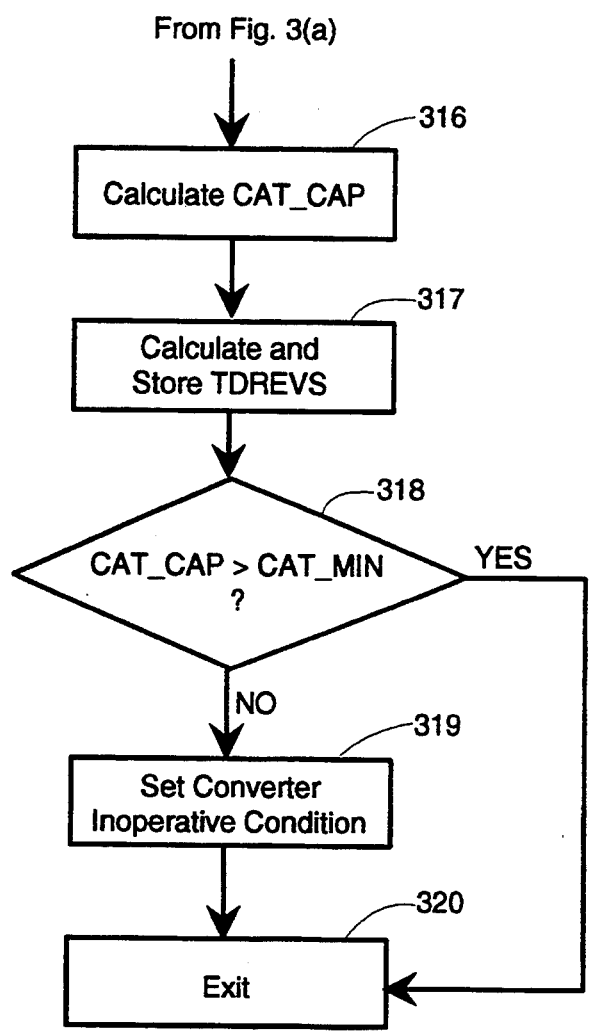

FIGS. 3(a) and 3(b) of the drawings show the steps taken by the preferred embodiment to implement a converter test routine which determines the efficacy of the catalytic converter 32 in the manner shown graphically in FIG. 2(a-c). The converter test routine is entered at 301 when the engine is operating under substantially static operating conditions. At 302 a first bias value is added to the air/fuel mixture. The loop comprising steps 303 and 304 is executed until the exhaust gas generated by combustion of the biased air/fuel mixture is detected by the upstream HEGO sensor, designated in FIG. 3 as HEGO 1. At 305 a variable, TIME1, which represents the period of time elapsed from the biasing of the air/fuel mixture to the detection by the upstream HEGO sensor of the exhaust gas generated by combustion of the biased air/fuel mixture is stored in memory.

The loop comprising steps 306 and 307 is then executed until the exhaust gas generated by combustion of the biased air/fuel mixture is detected by the downstream HEGO sensor, designated in FIG. 3(a) as HEGO 2. At 308 a variable, TIME2, which represents the period of time elapsed from the detection by the upstream HEGO sensor of the exhaust gas generated by combustion of the biased air/fuel mixture to the detection by the downstream HEGO sensor of the biased air/fuel mixture as it exits the catalytic converter, is stored in memory.

At step 309, the air/fuel mixture is abruptly altered by removing the first bias value and adding a second bias value. As shown in FIG. 2(a), this second bias value preferably biases the air/fuel mixture by a magnitude substantially equal to the first bias value but in a direction, relative to stoichiometry opposite that of the first bias value. Steps 309 to 315 are performed in a manner similar to that described above for steps 302 to 308. Steps 310 and 311 are performed until the exhaust gas generated as a result of the second bias value is detected at the upstream HEGO sensor. At 312, a variable TIME3 representative of the period of time elapsed from the biasing of the air/fuel mixture by the second bias value to the detection by the upstream HEGO sensor of the exhaust gas generated by combustion of such biased air/fuel mixture is stored in memory. The loop comprising steps 313 and 314 is executed until the exhaust gas generated by combustion of the biased air/fuel mixture is detected by the downstream HEGO sensor. At 315, a variable, TIME4, which represents the period of time elapsed from the detection by the upstream HEGO sensor of the exhaust gas generated by combustion of the biased air/fuel mixture to the detection by the downstream HEGO sensor of the biased air/fuel mixture as it exits the catalytic converter is stored in memory.

In FIG. 3(b), at 316, a value CAT_CAP, which is indicative of the capacity of the catalyst material in the catalytic converter 32 is determined preferably by calculating a rich capacity value, CAT_CAP_R indicative of the capacity of the converter to process a rich air/fuel mixture, calculating a lean capacity value, CAT_CAP_L, indicative of the capacity of the converter to process a lean air/fuel mixture, and averaging the values. CAT_CAP_R is obtained by calculating the integral of the A/F signal as it varies over a time period starting from the detection of the exhaust gas generated as a result of the first bias value by the upstream HEGO sensor (time 203) to the detection of the catalyzed exhaust gas generated as a result of the first bias value by the downstream HEGO sensor (time 204). CAT_CAP_L is similarly calculated for the second bias value by calculating integral of the A/F signal as it varies over a time period starting from the detection of the exhaust gas generated as a result of the second bias value by the upstream HEGO sensor (time 205) to the detection of the catalyzed exhaust gas generated as a result of the second bias value by the downstream HEGO sensor (time 206). The two values are then averaged to form the value CAT_CAP seen at 316. The value CAT_CAP can be seen in FIG. 2(a) graphically as the average of the area between the A/F signal and stoichiometry from time 203 to time 204 (CAT_CAP_R) and of the area between the A/F signal and stoichiometry from time 205 to time 206 (CAT_CAP_L).

At 317, the value TDREVS which is indicative of the time elapsed from the generation of a particular air/fuel mixture by the air/fuel signal to the detection of the exhaust products of the air/fuel mixture by the upstream HEGO sensor (time 202 to time 203) is calculated and stored, and at 318 the converter storage capacity variable, CAT_CAP is compared against a predetermined minimum capacity, CAT_MIN and a converter inoperative condition is set at 319 if the converter storage capacity is less than or equal to CAT_MIN, and the routine is exited at 320. In an alternative embodiment, separate converter capacity values are used to compare the ability of the converter to process a rich air/fuel mixture and a lean air/fuel mixture. CAT_CAP_R is compared to a predetermined minimum rich capacity value CAT_MIN_R and CAT_CAP_L is compared to a predetermined minimum lean capacity value CAT_MIN_L. The converter inoperative condition is set if either CAT_CAP_R or CAT_CAP_L is below its respective minimum capacity value.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In an internal combustion engine comprising a catalytic converter for processing an exhaust gas produced from the combustion of an air/fuel mixture within said engine, a system for testing the catalytic converter, comprising first sensing means for detecting the oxygen content of the exhaust gas entering the catalytic converter, second sensing means for detecting the oxygen content of the exhaust gas exiting the catalytic converter, means for maintaining the air/fuel mixture at a first bias value, means for calculating a first time value indicative of the time required for said first sensing means to detect the exhaust gas produced from the combustion of the air/fuel mixture maintained at the first bias value, means for calculating a second time value indicative of the time required for said second sensing means to detect the exhaust gas produced from the combustion of the air/fuel mixture maintained at the first bias value, and means, responsive to said first bias value and to said first and said second time values, for determining the efficacy of said catalytic converter.

2. The invention as set forth in claim 1 wherein the means for determining the efficacy of said catalytic converter, comprises means, responsive to said first bias value and said first and second time values for calculating a catalytic converter storage capacity, means for comparing said catalytic converter storage capacity to a predetermined range, and means for setting a converter inoperable condition if said converter is outside of said range.

3. The invention as set forth in claim 2 further comprising, means, responsive to the detection by the second sensing means of the exhaust gas produced from the combustion of the air/fuel mixture maintained at the first bias value, for maintaining said air/fuel mixture at a second bias value, means for calculating a third time value indicative of the time required for said first sensing means to detect the exhaust gas produced from the combustion of the air/fuel mixture maintained at the second bias value, and means for calculating a fourth time value indicative of the time required for said second sensing means to detect the exhaust gas produced from the combustion of the air/fuel mixture maintained at the second bias value, and wherein the means for determining the efficacy of said catalytic converter is additionally responsive to said second bias value and to said third and fourth time values.

4. The invention as set forth in claim 3 further comprising, means for measuring the rotational speed of said engine, means for measuring the mass of air flow into said engine to provide an indication of engine load, and means for storing the first time value in a non-volatile memory as a function of said rotational speed and load.

5. The invention as set forth in claim 4 wherein the means for maintaining the air/fuel mixture at a second bias value comprises means for abruptly altering the air/fuel mixture from said first bias value to said second bias value.

6. In an internal combustion engine comprising a catalytic converter for processing an exhaust gas produced from the combustion of an air/fuel mixture within said engine, a method of determining the efficacy of the catalytic converter, comprising the steps of:

detecting the exhaust gas by a first sensor positioned upstream of said catalytic converter, and by a second sensor positioned downstream of said catalytic converter, maintaining the air/fuel mixture at a first bias value;

calculating a first time delay value indicative of the time delay from the detection by the first sensor of the exhaust gas produced from the combustion of the air/fuel mixture maintained at the first bias value to the detection by the second sensor of the exhaust gas produced from the combustion of the air/fuel mixture maintained at the first bias value;

maintaining the air/fuel mixture at a second bias value upon the detection of the biased air/fuel mixture by the second sensor;

calculating a second time delay value indicative of the time delay from the detection by the first sensor of the exhaust gas produced from the combustion of the air/fuel mixture maintained at the second bias value to the detection by the second sensor of the exhaust gas produced from the combustion of the air/fuel mixture maintained at the second bias value and processed by the catalytic converter; and determining the efficacy of said catalytic converter as a function of the first time delay value, the second time delay value, the first bias value and the second bias value.

7. The invention as set forth in claim 6 comprising the additional steps of, measuring the rotational speed of said engine, measuring the mass of air flow into said engine to provide an indication of engine load, and storing the first time value in a non-volatile memory as a function of said rotational speed and load.

8. The invention as set forth in claim 7 wherein the first and second sensors are heated exhaust gas oxygen sensors.

9. In an internal combustion engine comprising a catalytic converter for processing an exhaust gas produced from the combustion of an air/fuel mixture within said engine, a system for testing the catalytic converter, comprising:

a first oxygen sensor for detecting the oxygen content of the exhaust gas entering the catalytic converter, a second oxygen sensor for detecting the oxygen content of the exhaust gas exiting the catalytic converter, electronic engine control means comprising, means for maintaining the air/fuel mixture at a first bias value, means for calculating a first time value indicative of the time required for said first oxygen sensor to detect the exhaust gas produced from the combustion of the air/fuel mixture maintained at the first bias value, means for calculating a second time value indicative of the time required for said second oxygen sensor to detect the exhaust gas produced from the combustion of the air/fuel mixture maintained at the first bias value, means, responsive to the detection by the second oxygen sensor of the exhaust gas produced from the combustion of the air/fuel mixture maintained at the first bias value, for abruptly altering the air/fuel mixture from said first bias value to said second bias value and for maintaining said air/fuel mixture at said second bias value, means for calculating a third time value indicative of the time required for said first oxygen sensor to detect the exhaust gas produced from the combustion of the air/fuel mixture maintained at the second bias value, means for calculating a fourth time value indicative of the time required for said second oxygen sensor to detect the exhaust gas produced from the combustion of the air/fuel mixture maintained at the second bias value, means, responsive to said first bias value, said second bias value and to said first, second, third and fourth values, for calculating a catalytic converter storage capacity, means for comparing said catalytic converter storage capacity to a predetermined range, and means for setting a converter inoperable condition if said converter is outside of said range.

10. The invention as set forth in claim 9 further comprising, means for measuring the rotational speed of said engine, means for measuring the mass of air flow into said engine to provide an indication of engine load, and means for storing the first time value in a non-volatile memory as a function of said rotational speed and load.

11. The invention as set forth in claim 10 wherein the first and second oxygen sensors are heated exhaust gas oxygen sensors.

* * * * *